Figure 1:
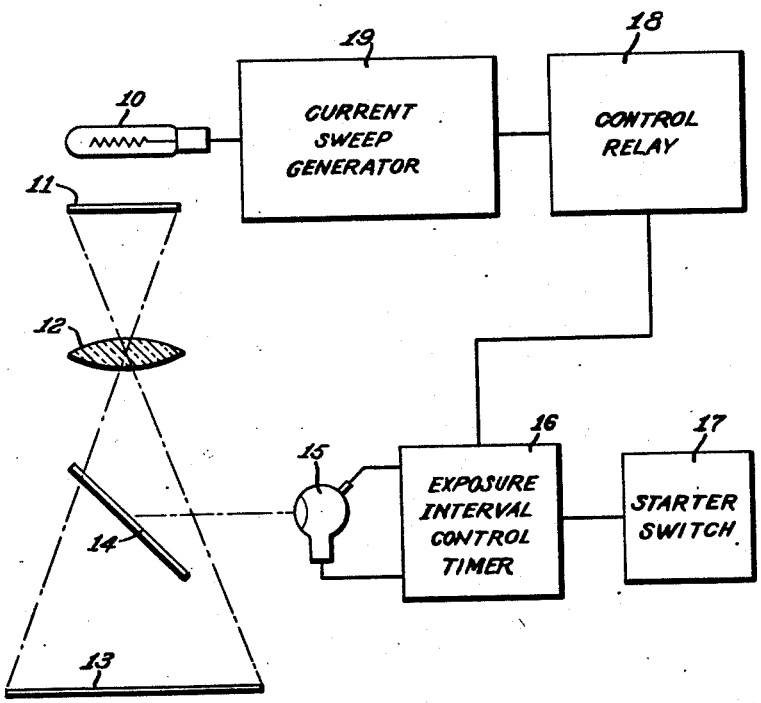

Aug. 19, 1952     J. RABINOWITZ     2,607,266
PHOTOGRAPHIC PRINTING APPARATUS
Filed Sept. 26, 1949                 2 SHEETS—SHEET 1

INVENTOR.
Jacob Rabinowitz
BY
ATTORNEYS

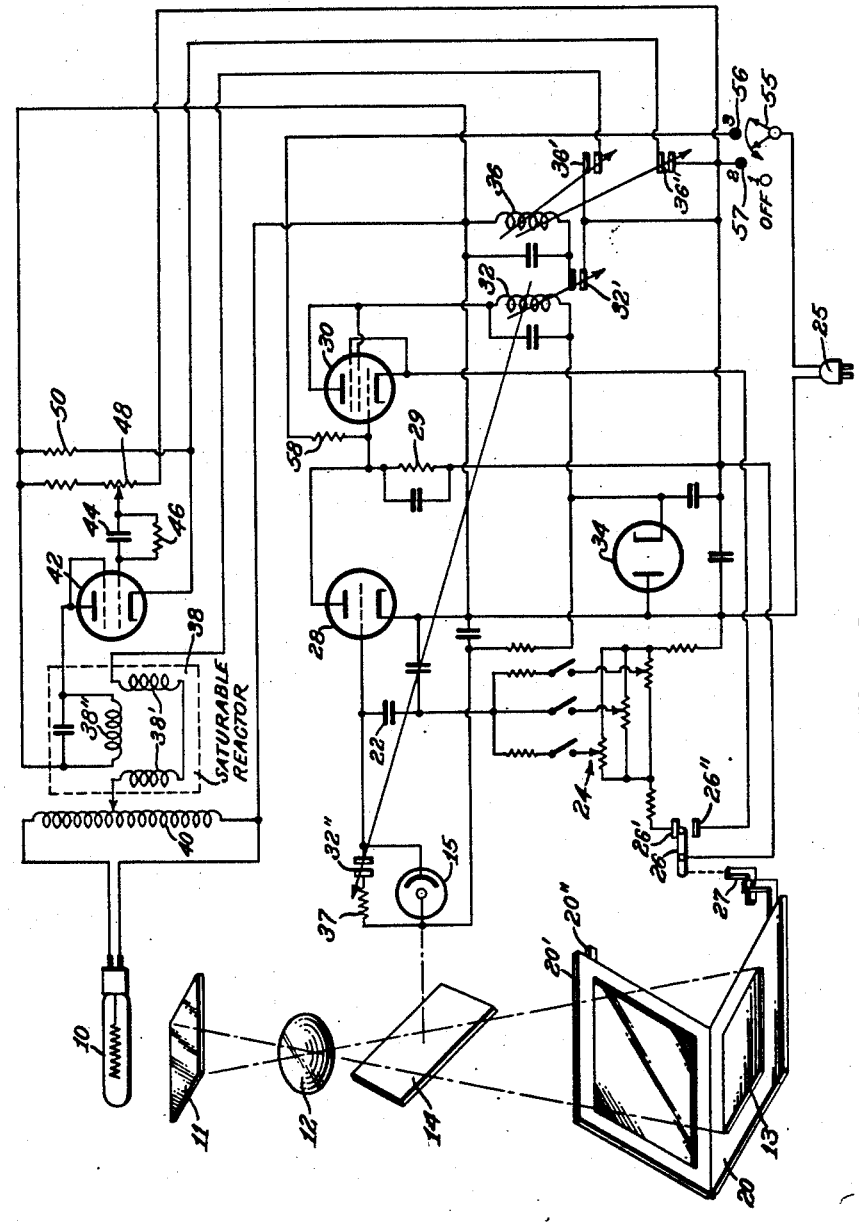

Patented Aug. 19, 1952

2,607,266

UNITED STATES PATENT OFFICE 2,607,266

PHOTOGRAPHIC PRINTING APPARATUS

Jacob Rabinowitz, Brooklyn, N. Y.

Application September 26, 1949, Serial No. 117,768

8 Claims. (Cl. 88—24)

1

The present invention relates in general to photographic printing methods and apparatus, and more particularly to photographic printing systems in which the exposure interval is apportioned to the density of the record being printed by means sensitive to the intensity of the exposing light.

This class of device has extremely wide commercial application in automatic rapid photographic printing devices, particularly for use by commercial photographers and other photographic developing enterprises in which a large group of developed photographic records, such as photographic film negatives, are desired to be automatically advanced through the printing device to expose photosensitive recording surfaces uniformly. As the density of the photographic negatives in such a group will vary over a wide range, due to the composition of the recorded image and variations in the camera exposure interval, some light sensitive control means for altering the exposure interval in accordance with variations in the density of the photographic record are necessary to achieve any degree of uniformity in the photographic prints.

Prior art apparatus for effecting this exposure control generally comprise a photocell or similar light sensitive device disposed incident to a portion of the exposing light after its transmission through the photographic record to be copied, so that the amount of light falling on the photocell is proportional to the density of the photographic record as well as to the intensity of the light emitted by the printing lamp. Conventionally, the photocell or light sensitive means is of the type whose current conductivity varies directly with the quantity of light falling on the photocell, and is intercoupled with energy storage device and an electronic exposure timer to vary the rate of charging or discharging of the storage device in accordance with the density of the record and the intensity of the printing light. The storage device generally controls a vacuum tube relay circuit or the like to terminate exposure in the photographic printer when a photographic recording surface has been exposed to some preselected standard quantum of light.

These prior art photo printing devices operate very satisfactorily for photographic printing from records of average or greater than average density, but exhibit considerable variation in the quantum of exposing light admitted to the photosensitive recording surface when very thin or somewhat less than average density of photo-

2 graphic records are employed. This failing is principally due to the fact that it is the substantially universal practice to apply full supply line voltage and current to the printing lamps to illuminate the same at their full luminous intensity immediately on initiation of the exposure. Thus, for such very thin photographic records, requiring a very small quantum of exposing light to expose the photosensitive surface to the appropriate intensity level, the luminous intensity of the exposing light would be too great to realize the high degree of accuracy in exposure timing before termination of the exposure obtaining with average or dense photographic records.

Likewise, as the photocell employed in the prior art exposure timing circuits is disposed in the charging as well as the discharging path of the exposure control energy storage device in many prior art exposure timers, it is necessary to render the photocell somewhat conductive during the period in between exposures to effect reconditioning of the energy storage device for a subsequent exposure period. This has been achieved in the prior art by employing a control photocell which has a high response characteristic in the red or infra red spectral regions, and a red or infra red emitting lamp is employed which is energized during the non-exposure portion of the operating cycle to maintain the photocell conductive by red of infra red light. As most photosensitive papers are relatively very insensitive to the low actinic red or infra red radiations, such radiations will not markedly expose the photosensitive surface during the non-exposure portion of the operating cycle. However, some slight exposing of the photosensitive surface has been found to occur through such an arrangement, which undesirably affects the degree of uniformity obtainable from such printing device. Also, as the photocell in this arrangement must be sensitive to red or infra red radiations, its sensitivity and operational characteristics in the shorter wave length yellow and blue spectral regions must be proportionately reduced, so that the photocell is less efficient to appropriately control the charging or discharging of the energy storage device in accordance with the intensity of high actinic exposing light in the yellow and blue spectral regions to which the photosensitive surface is highly sensitive.

As stated above, a number of arrangements are known for controlling a photographic printing exposure interval by translating luminous printing intensity into different time intervals proportioned to the density of the photographic record being copied. However, apparatus employing prior art methods of achieving the high degree of accuracy in exposure control over the wide range of exposures required in commercial photo finishing, to achieve highly uniform printing despite the wide variations in the density of the photographic record, tends to become highly complicated, requiring a large number of electronic control circuits or the like which have peak efficiency characteristics over different segments of the entire exposure range. This, however, would involve such a large and expensive installation that photographic printers constructed in keeping with such high standards of accuracy would be of substantially prohibitive cost and physical character to the ordinary commercial photo printing enterprise. The purpose of providing an effective automatic photographic printer capable of producing uniform photographic prints notwithstanding the wide variations in film record densities encountered, which would be adaptable for effective use by the ordinary commercial photo finisher would, therefore, be defeated.

An object, therefore, of the present invention is the provision of novel automatic photographic printing apparatus and method which will produce prints of uniform density at high speed for wide variations in density of the photographic record to be copied.

Another object of the present invention is the provision of novel automatic photographic printing apparatus and method which conforms to high standards of accuracy in uniformity of exposure over a wide range of photographic negative densities, and which is of relatively low cost and simple construction.

Another object of the present invention is the provision of a photosensitive automatic photographic printing device and method which is effective over a wide range of photographic negative densities to translate printing light intensity into time intervals accurately proportioned to the light transmission characteristic of the negative to yield uniform photographic prints over a wide range of photographic negative densities.

Another object of the present invention is the provision of novel automatic photographic printing apparatus which is adapted to effect printing of photographic records with an accurately controlled quantum of exposing light varied through a selected range of spectral radiation frequencies.

Another object of the present invention is the provision of a highly accurate automatic photographic printing exposure device adapted to effectively use the spectral sensitivity characteristics of photosensitive surfaces to achieve uniformity of exposure over a wide range of photographic record densities.

Another object of the present invention is the provision of a novel photo printing exposure control device adapted to expose photosensitive surfaces to a controlled quantity of exposing light progressively varied from a low actinic radiation frequency to an appropriate high actinic radiation frequency to produce high uniformity prints for a wide range of photographic record densities.

Other objects, advantages and capabilities of the present invention will become apparent from the following detailed description, taken in conjunction with the accompanying drawings in which only a preferred embodiment of the invention is shown.

In the drawings:

Figure 1 is a functional block diagram of a photographic printing device embodying the present invention, illustrating the critical circuit components of the exposure interval timer and printing lamp driver, and Figure 2 is a schematic circuit diagram of an example of a photographic printing apparatus embodying the present invention, showing the location of the printing lamp and photoelectric cell in relation to the optical components of the printing apparatus.

Referring to the drawings, wherein like reference characters designate corresponding parts throughout the several figures, and with special reference to Figure 1, there is shown diagrammatically a photographic printing apparatus comprising a photographic printing lamp 10, preferably, a high wattage lamp of the conventional types, for example, one of the commercially marketed 500 watt projection lamps, which emit long wave length non-actinic light in the red spectral region on low current energization, and which, as the energizing current is increased, emit light of progressively shorter wave lengths falling within the relatively high actinic regions. The printing lamp 10 is positioned to illuminate the record 11 which is to be copied, usually a photographic negative. The illuminated photographic record 11 is imaged through a suitable lens 12 on to a photosensitive surface 13, such as any of the commercially available photographic printing papers. The initiation and termination of the exposure interval may be controlled by any of several known methods, such as by providing a shutter between the printing lamp 10 and the photosensitive surface 13 which is actuated by a relay, solenoid or other suitable device to interrupt imaging of the photographic record 11 on the photosensitive surface, or by means for positively controlling the energizing current supply to the printing lamp 10. For purposes of the present description, however, it is preferred that the initiation and termination of the exposure interval be effected by interrupting the electrical energizing current supply to the printing lamp 10.

To properly apportion the exposure interval to the density of the photographic record 11 to produce uniform photographic prints for a wide range of variation in the density of the photographic records to be copied, a semitransparent reflector 14 of conventional design is interposed in the optical imaging path of the lens 12 between the lens and the photosensitive surface 13, disposed at an angle to the principal optical axis of the lens 12 to reflect a portion of the exposing light transmitted through a photographic record 11 and lens 12 on to a light sensitive photoelectric cell 15. The light sensitive photoelectric cell 15 is of the conventional commercially available types which conduct current when incident light impinges upon the sensitive plate of the cell, and in which the rate of current conductivity bears a direct proportional relationship to the intensity or quantum of light falling thereon.

In the present invention the photocell 15 is intercoupled with a suitable photoprinting exposure interval timer device, indicated at 16 in the functional block diagram, which may be any of several suitable photographic printing exposure interval control devices known to the prior art, such for example, as the photo printing exposure control timer disclosed in U. S. Patent 2,258,994 granted October 14, 1941 to W. E. Merryman et al., or that disclosed in U. S. Patent 2,353,218 issued July 11, 1944 to Bradshaw Burnham et al. As before mentioned, there are a number of prior art devices which are capable of effectively controlling a photographic printing exposure interval to terminate the exposure of a photographic record when an appropriate quantum of exposed light has been transmitted therethrough, by translating luminous printing intensity into different time intervals proportioned to the density of the photographic record being copied. These photo printing exposure interval timers in general employ an energy storage device, such as a condenser, which is charged or discharged or both, through the light sensitive photocell, and which is rapidly discharged or is precharged during the portion of the operating cycle of the device between printing exposure intervals. As the current conductivity of the photocell varies in accordance with the intensity of the light falling thereon, it will be apparent that the rate of charging or discharging of the energy storage condenser during the exposure interval will be proportioned to the intensity of the exposing light and the density of the photographic record. The charge across the energy storage condenser is, therefore conventionally used to control a vacuum tube relay or similar device, which in turn controls the energizing voltage supply to the printing lamp to initiate or terminate illumination of the printing lamp, or controls a solenoid actuated shutter or the like interposed in the optical path of the printer.

A suitable starting switch, indicated generally at 17, is intercoupled with the exposure interval timing device 16 to condition the timer 16 and photocell 15 to respond to the quantum of light transmitted throughout photographic record 12. In general, the timer control operates to interrupt the energizing voltage supply to the printing lamp when the charge on the energy storage condenser in the timer 16 reaches a preselected value determined from the quantum of exposing light required for a photographic record of average density to produce a photographic print of proper contrast and density.

Thus far the device described corresponds substantially to those previously used by the prior art. The present device, however, contemplates the provision of a driver element or control relay, indicated generally at 18, intercoupled with the exposure interval timer 16 and controlled directly or indirectly by the starter switch 17 to set into operation an electrical current sweep generator, indicated at 19, operative to produce a recurrent electrical current supply which progressively increases with time throughout the exposure period for energizing the printing lamp 10. The current sweep generator is designed to produce a recurrent saw-tooth current output having an approximately linear time rate of change of current characteristic of an amperage value which is initially just sufficient to cause the filament of the printing lamp 10 to emit light, and which progressively increases until the printing lamp 10 is energized to full luminous intensity. The period of the current sweep output of the generator 19 is preferably set within the range from three to five seconds in order that a complete exposure for an extremely dense photographic record may be had within something less than five seconds. This interval is determined primarily from practical considerations, and is designed to be as short as possible commensurate with proper uniform exposure of thin negatives, in order to permit rapid printing of a large number of photographic records.

The output of the current sweep generator 19 supplying the energizing current for the printing lamp which increases substantially linearly with time throughout the exposure cycle, is designed to take advantage of the spectral distribution characteristics of high wattage photographic printing lamps. These lamps generally exhibit the characteristic that on low current energization of the lamp filament, the predominant portion of the visual radiations emitted by the lamp fall in the longer wave length or red portions of the visual radiation spectrum. As the excitation current is progressively increased, however, progressively shorter wave length radiations are emitted by the lamp, carrying its predominant spectral distribution characteristics first into yellow and then to the near-blue. As commercial photosensitive printing papers are only slightly sensitive to red light, and are progressively more sensitive to yellow, green and blue light, it will be apparent that during the period immediately after initiation of an exposure, the photosensitive surface will be exposed at a very slow rate, but as the printing lamp excitation current increases with time, the actinic value of the exposing light is correspondingly increased and the photosensitive paper is exposed at a much higher rate.

The advantages of this in achieving substantially complete uniformity in the quantum of light to which the photosensitive surface is exposed for a wide range of photographic record densities should be apparent. As previously stated, for very thin photographic records, the amount of light transmitted through the record is so great that when the full supply line excitation voltage and current is supplied to the printing lamp during the entire period of exposure as in prior art photoprinting apparatus, the timer cannot effectively terminate the exposure with the high degree of accuracy with which it controls exposure through dense or average photographic records. This is because the quantum of light being dealt with is too great for the exposure interval to be effectively regulated, as practical considerations require that the maximum exposure interval for even exceedingly dense photographic records in such automatic printing devices be very short, generally on the order of three to five seconds. This failing is effectively remedied in the present device, as the exposing light initially directed through the photographic record is of such a low actinic value that the rate of exposure of the photosensitive paper is initially exceedingly slow. Thus, for very thin photographic records, the quantum of light dealt with during the initial moments of the exposure interval is sufficiently reduced for the exposure interval timer to accurately regulate exposure of the photosensitive surface.

The operation of the photographic printing device embodying the concept of the present invention is substantially as follows:

For the purposes of this description it will be assumed that the starter switch indicated at 17 is actuated manually by the operator to initiate an operating cycle of the printing device, but it is to be understood that the starter switch may be actuated by a suitable offset or projection on a pivoted photosensitive printing paper frame or the like, to adapt the device to automatic printers in which the printing paper and photographic records are fed automatically. Actuation of the starter switch 17 intercoupled with the exposure interval timer 16 operates to condition the timer to meter the quantum of exposing light transmitted through the photographic record 11 to be printed.

In most prior art exposure interval timers the function of the starter switch is to intercouple the charge across an energy storage device to the control grid of the vacuum tube relay to interrupt conduction through the relay and energize the photographic printing lamp, such as the printing lamp 10, or remove a shutter from the optical path of the printer. The light sensitive photoelectric cell 15 disposed to receive a preselected proportion of the light transmitted through the photographic record 11 reflected from the semi-transparent reflector 14, conducts current at a rate proportional to the quantity of light transmitted by the record 11, and is generally disposed across the energy storage capacitor in the exposure interval timer 16 to discharge the capacitor at a rate proportional to the quantum received by the cell 15. It will be apparent that after an appropriate interval of conduction through the photocell 15, the energy storage capacitor will be discharged to the point that the vacuum tube relay is biased to conduct and a termination signal is generated to either extinguish or interrupt the light source.

In the instant device, the starter switch likewise energizes the control relay 18 to which it is intercoupled through the exposure control timer 16, the control relay 18 is turn energizing the current sweep generator 19 to initiate a substantially linearly increasing current output to energize the printing lamp 10. Thus, the printing lamp 10 is energized initially by a very low current, the lamp 10 therefore initially operating at a very low luminous intensity and producing radiation falling within the low actinic red regions of the visible spectral. As the energizing current supply to the lamp 10 is linearly increased throughout the operating cycle of the device, the actinic value and the luminous intensity of the light emitted by lamp 10 is progressively increased until a sufficient quantum of light has actuated the photoelectric cell 15 to discharge the energy storage device in the exposure control timer 16. The exposure interval timer 16 is intercoupled with current sweep generator control relay 18 to interrupt the current supply from the current sweep generator 19 to the lamp 10 and extinguish the lamp 10, thereby terminating the exposure. The exposure interval timer is, of course, adjusted in a known manner to produce a signal when a preselected quantum of light has impinged upon the sensitized plate of the photoelectric cell 15, which quantum of light is proportioned to the exposing light required for a proper exposure of the photosensitive circuit 13 to yield a print of desired character. In this manner, the high light transmission characteristics of a very thin photographic record 11 does not materially disturb the ability of the photographic printing apparatus to produce prints of uniform density, as the actinic value of the exposing light initially emitted by the printing lamp 10 is sufficiently low to permit effective control of the exposure interval to be realized by the exposure interval timer 16.

The current sweep generator 19 may be constructed in various forms without departing from the scope of the inventive concept, as the specific means for producing the desired linearly increasing current output to energize the photographic printing lamp does not constitute a restriction upon this application. It is only necessary that the total power supplied the photographic printing lamp 10 by the sweep generator 19 within the range through which the current is swept must be sufficient to vary the quantum of light emitted by conventional commercially available high photographic printing lamps from its threshold or minimum luminous intensity to substantial maximum luminous intensity. It will be apparent that several distinct types of electrical systems may be designed using prior art electrical components and circuit arrangements. Furthermore, the sweep current output produced by the generator need not continuously progress from the low current level to the maximum current level without interruption, but may be an irregularly increasing wave form, such as a stepped current output that may be produced by a plurality of vacuum tube controlled relays set for progressively increasing current outputs.

An example of a specific circuit which may be employed as the components of the photographic printing apparatus shown in Figure 1, is illustrated in Figure 2. It is expressly understood that the invention is not limited to the specific electrical components and circuit relationship disclosed in Figure 2 however, as other circuit arrangements may be employed to perform the various functions of applicant's apparatus which will fall within the scope of applicant's inventive concept. Referring particularly to Figure 2, there is shown a high wattage printing lamp 10 of the character previously described, positioned to emit exposing light which is transmitted through a photographic record 11 and imaged through a suitable optical lens system 12 on to a photosensitive surface 13. The photosensitive surface 13 is illustrated as housed in a photographic paper frame 20 of suitable construction having a hinged platen or cover 20' carrying an offset or lug 20''. A semi-transparent reflector 14 is interposed in the optical system and positioned to intercept the optical axis of the printer to reflect a portion of the light transmitted through the photographic record 11 and lens 12 on to a light sensitive cell 15 to activate the cell and vary its current conductivity in proportion to the quantum of light emitted by the printing lamp 10 and transmitted through the photographic record 11. The photoelectric cell is preferably of the type having what is known in the art as an S-4 surface, having low response characteristics in the red and infra-red spectral regions.

The photographic cell 15 is electrically intercoupled with an energy storage device, such as condenser 22, to discharge a previously applied charge across the condenser 22 at a rate determined by the current conductivity of the photocell 15. The condenser 22 is intercoupled in series circuit relation with a potentiometer network indicated generally at 24, which is coupled across an alternating current power source through a suitable plug 25 during the non-exposure portion of the operating cycle of the photographic printing apparatus. The plug 25 in the present circuit is adapted to be coupled to a conventional commercially available source of electrical power, the circuit being designed for operation on 115 volts 60 cycle alternating current power. A switch 26, such for example a conventional mercury switch, is provided with a contact 26' coupled in series circuit relation between one end of the potentiometer 24 and the plug 25, and is controlled by a suitable actuating device indicated generally at 27 disposed to be tripped by the offset lug 20" of the printing frame lid 20' to couple the electric power supply from the plug 25 to the potentiometer 24 when the printing frame lid 20' is in open position, that is during the non-exposure portion of the operating cycle of the instant device. The condenser 22 is, therefore, charged to the peak value of the alternating current potential at the arm of the potentiometer 24 during the non-exposure portion of the operating cycle. The potentiometer 24 is, of course, manually pre-set to produce a charge on the condenser 22 appropriate to permit a preselected quantum of exposing light to be transmitted to the photosensitive surface 13 before the photocell 15 has been rendered sufficiently conductive to discharge the condenser 22.

The potentiometer network 24 is coupled in series with the condenser 22 across the control grid cathode of a suitable thermionic vacuum tube 28, illustrated in this embodiment as a triode. Conduction through the vacuum tube 28 is therefore controlled by the charge on the condenser 22, interruption of the series circuit through the switch 22 from the potentiometer network 24 to the power supply plug 25 after charging of the condenser 22 biasing the grid of the vacuum tube 28 below cut off during the exposure portion of the operating cycle when the contact 26' of the switch 26 is open circuited.

A second thermionic vacuum tube 30 illustrated in this embodiment as a pentode, is intercoupled with the vacuum tube 28, the control grid of the pentode 30 being connected to the plate circuit of the tube 28 above the plate circuit resistor 29. The cathode of the pentode 30 is directly coupled to a second contact 26" of the control switch 26, which contact 26" may be electrically intercoupled through the arm of the switch 26 to one side of the alternating current supply through the power plug 25 during the exposure portion of the operating cycle when the lid 20' of the photographic paper frame 20 is closed. The plate of the pentode 30 is directly coupled through a relay coil 32 to the cathode of a diode section indicated at 34, the diode 34 being employed to supply direct current for the plate circuit of the pentode 30 and also to supply direct current for the anode of the photocell 15. The relay coil 32 in the plate circuit of the pentode 30 has a pair of normally open contacts 32' and a pair of normally closed contacts 32" disposed to be controlled by conduction of current through the relay coil 32. The normally open contacts 32' are coupled in series circuit relation with the coils 36 of a second relay coupled across the alternating current supply at the power plug 25, the contacts 32' being adapted to be closed on conduction of current through the pentode 30 and relay coil 32 to close the series circuit through the relay coil 36. The normally closed contacts 32" are coupled in series with a resistor 37 across the photocell 15 to close the circuit through the resistor 37 and establish a shunting path across the photocell 15 in the charging circuit of the condenser 22 on non-conduction of the pentode 30 during the non-exposure portion of the operating cycle. In this manner, the photocell 15 is completely removed from the circuit during charging of the condenser 22, and the necessity of employing a red sensitive photocell and a red lamp energized during the non-exposure portion of the operating cycle to maintain the photocell slightly conductive is obviated.

The relay coil 36 controls a pair of normally open relay contacts 36' and 36", one contact of each of which is directly intercoupled to one side of the alternating current supply through power plug 25. One contact point of the relay contact 36' is coupled to the alternating current input of a saturable reactor 38 of the type having a pair of series coupled alternating current coils 38' and a direct current coil 38", thus placing the relay contact 36' in the series alternating current supply circuit to the saturable reactor 38. The alternating current output from the coils 38' of the saturable reactor 38 are coupled into the movable tap of an auto-transformer 40 of conventional design, the coil of which is coupled across the filament terminals of the printing lamp 10 and one end of which is coupled to a side of the A. C. supply at plug 25. One contact point of the relay contact 36" is likewise coupled to the cathode of a thermionic vacuum tube 42 to couple the cathode of the tube 42 to one side of the alternating current supply when the contacts 36" are closed by the relay coil 36.

The thermionic vacuum tube 42 is adapted to provide a swept direct current to the direct current control coil 38" of the saturable reactor 38 for varying the alternating current output of the saturable reactor. To this end, a suitable condenser 44 is provided with a by-pass resistor 46 and is coupled in series circuit relation between the control grid of the vacuum tube 42 and the movable arm of a potentiometer or other suitable voltage divider 48 coupled across the alternating current supply through the plug 25. A plate-cathode resistor 50 is coupled across the tube 42.

The saturable reactor 38 is of known construction and characteristics, and is formed from an inductance or a reactor having an iron core which will normally permit only a small current to flow for a given impressed A. C. voltage. The iron core is deliberately saturated by winding on the core a coil through which a controlled direct current is passed. This decreases the inductive effect for the alternating current and also permits a much greater current to flow. Since once the direct current has built up to its full value, the losses in circuit are only slightly more than the resistance heat losses, and it is possible for a small amount of D. C. energy to control many hundreds of times as much A. C. energy as with other types of winding.

Operation of the described embodiment of the photographic printing apparatus control circuits is substantially as follows:

When the pivoted lid 20' of the photographic paper frame 20 is in open position, the offset lug 20" on the pivoted lid 20' is disengaged from the actuating element 27, constituting in this embodiment a bell crank intercoupled with the arm of the mercury switch 26. With this condition obtaining, the movable arm of the mercury switch 26 which is coupled to one side of the alternating current supply is in engagement with the contact 26' disposing the potentiometer network 24 across the alternating current supply to charge the capacitor 22 through the rectifying action of the grid of the triode 28 to a preselected potential determined by the setting of the movable arms on the potentiometer 24. In this condition, the vacuum tube triode 28 is conductive, and the pentode 30 is non-conductive, due to the voltage drop across the resistor 29 in the plate circuit of the triode 28. Thus no current is flowing in the relay coil 32 so that the relay contacts 32" are in their normally closed condition by-passing the photocell 15 through the resistor 37 to effect rapid charging of the condenser 22.

During this non-exposure portion of the operating cycle when the triode 28 is conductive and the pentode 30 is cut off preventing flow of current through the relay 32, thereby open circuiting the relay contact 32' preventing current flow through the relay coil 36, the relay contacts 36' coupled to the cathode of the tube 42 are open circuited so that the cathode 42 is coupled to the same side of the alternating current supply as the plate of the tube 42, through the plate cathode resistor 50. There can therefore be no electron flow through the tube 42. However, the control grid of the tube 42 during this period is coupled through the condenser 44 to the movable arm of the potentiometer 48 coupled across the alternating current supply. During this non-exposure portion of the cycle, grid current will flow in the tube 42, charging the condenser 44 to substantially the full peak potential between the point to which the arm of the potentiometer 48 is set and the potential on the side of the alternating current supply line to which the plate of the tube 42 is coupled. This is because substantially the entire voltage developed across the potentiometer 48 is across the lower portion of the potentiometer, the upper resistance being extremely small relative to the resistance of the lower portion of the potentiometer 42. Thus, during the period between exposure intervals when the condenser 22 in the exposure interval timer is being charged to a preselected voltage determined by the setting of the potentiometer 24, the condenser 44 is likewise being charged to a potential determined by the setting of the potentiometer 48.

An exposure is initiated, in the present embodiment, by closing the pivotal lid 20' of the photographic printing paper frame 20, tripping the actuating device 27 to decouple the contact 26 from the movable arm of the switch 26' and couple the cathode of the pentode 30 to one side of the A. C. supply line through the contact 26". Interruption of the circuit through the contact 26' decouples one side of the potentiometer 24 from the A. C. supply, placing the charge on the condenser 22 on the grid of the triode 28 and biasing the triode 28 to cut off. There is a corresponding rise in the voltage on the control grid of the pentode 30 due to collapse of the current through the plate circuit resistor 29 of the tube 28, biasing the pentode 30 to conduction and energizing the relay coil 32 to close the contacts 32' and open the contacts 32".

Closure of the contacts 32' closes the circuit through relay coil 36, placing the relay coil 36 across the A. C. supply and closing the contacts 36' and 36" associated with the relay coil 36. Closure of the contacts 36' couples the input to the A. C. coils 38' of the saturable reactor 38 to one side of the A. C. supply to condition the saturable reactor to produce an A. C. output current. Closure of the contacts 36" couples the cathode of the vacuum tube 42 to the other side of the A. C. supply line to which the plate of tube 42 is coupled, conditioning the tube 42 to conduct. As the grid bias on the control grid of the tube 42 is determined by the negative D. C. voltage stored in the capacitor 44 during its charging period, the cathode to grid potential of the tube 42 now consists of the negative D. C. voltage stored in the condenser 44 superimposed on an inphase A. C. voltage consisting of that portion of the voltage across the potentiometer 48 between the contact arm of the potentiometer 48 and the side of the A. C. line to which the cathode of tube 42 is coupled. The conduction rate of the tube 42 will follow the exponential voltage variation across the capacitor 44 as it discharges through the resistor 46 producing a substantially linear D. C. rising wave form in the D. C. control coil 38" of the saturable reactor 38. The linearly varying D. C. control current in the D. C. control coil 38" will cause a corresponding increase in the output A. C. current coupled from the saturable reactor 38. This substantially linearly increasing output A. C. current is coupled into the movable tap of an auto-transformer 40, the coil of which is coupled across the filament terminal of the projector lamp 10 with the lower end of the coil coupled to one side of the A. C. supply. The auto-transformer 40 is merely to replace the voltage losses occurring in the saturable reactor.

It will be apparent, therefore, that on initiation of an exposure by closing the lid 20' of the printing paper frame 20, the energy storage condenser 22 biases the control tube 28 to cut off and conditions the photocell coupled thereacross to discharge the condenser at a rate proportional to the quantum of light impinging upon the plate of the photocell 15. Simultaneously, the lamp is energized through the saturable reactor 38 and auto-transformer 40 with a progressively increasing A. C. current to begin exposure of the photosensitive surface 13. Initially, the A. C. current supplied to energize the printing lamp 10 is at a sufficiently low level such that substantially all of the visible radiation emitted by the lamp 10 is within the low actinic long wave length regions of the radiation spectrum, and as the current output from the saturable reactor 38 is increased, the wave length of the radiations emitted by the lamp 10 progressively increases, increasing the rate of exposure of the photosensitive surface 13 correspondingly. Thus, for a relatively thin photographic record 11 which transmits an extremely high quantum of light, the exposure rate of the photosensitive surface 13 is maintained sufficiently slow due to the low actinic value of the exposure light to permit the exposure interval timer to effectively measure the quantum of light received by the photocell 15 and open the relay contacts of the relay coils 32 and 36 to interrupt the A. C. supply to the saturable reactor and terminate the exposure.

It is believed to be evident from the above description that the apparatus of the present invention provides an extremely accurately timed exposure which will produce uniformly exposed prints for an extremely wide range of photograph record densities. The above described apparatus has extremely accurate response characteristics over the entire range of photographic record densities which would normally be encountered in photographic printing, so that the necessity of providing a plurality of light responsive control circuits having peak response characteristics over different narrow sectors of the entire range of photographic record densities is obviated. In this manner, the cost of such photographic printing devices is maintained at a relatively low level without sacrificing the quality or accuracy of prints.

While only a preferred embodiment of the invention has been specifically disclosed in the detailed schematic circuit diagram of Figure 2, it will be obvious that the invention is not limited to the exact forms illustrated and that many variations may be made in the particular connections employed.

If manual rather than automatic operation of the device is desired, a manual control switch, indicated generally at 55, may be connected to one of the leads from the power plug 25, and may be provided with a contact 56 disposed to be contacted by the switch 55 without the switch breaking its engagement with the contact 57. When the switch 55 is engaging both contacts 56 and 57, the grid of the pentode 30 is returned to the A. C. supply line through a grid circuit resistor 58 in parallel with the plate circuit resistor 29 coupled to the plate of the triode 28. The grid resistor 58 is selected to be of a sufficiently low value that the potential drop due to the plate current of the triode 28 is too small to bias the pentode 30 sufficiently to allow the relay coil 32 to release the armature contact 32' and 32". Therefore, the relay 32 is maintained energized, maintaining the relay 36 energized to supply current to the lamp 10 so long as the operator holds down the lid 20' of the printing paper frame 20.

While only one particular embodiment of the present invention has been specifically illustrated and described, it is distinctly understood that the invention is not limited thereto but that various modifications may be made therein without departing from the spirit and scope of the invention, and it is desired, therefore, that only such limitations shall be placed thereon as are imposed by the prior art and are set forth in the appended claims.

What is claimed is:

1. In apparatus for the automatic control of exposure intervals of photographic records of varying densities, light generating means for emitting photographic exposure radiations of actinic frequency determined by the intensity of excitation of the light generating means, exposure initiating means energizing said light generating means and varying the activation of the latter from a state of excitation producing low actinic exposing light to a state producing high actinic exposing light in a progressively increasing manner, and exposure terminating means responsive to the quantum and actinic frequency of light transmitted by the record to terminate the exposure when a sufficient quantum and actinic frequency of light has been transmitted through said record to expose a photosensitive surface to a preselected degree.

2. In apparatus for the automatic control of exposure intervals of photographic records of varying densities, light generating means for emitting visual radiation of actinic frequency determined by the intensity of excitation of said light generating means, exposure initiating means energizing said light generating means and varying activation of the latter from a very low initial state of excitation of low actinic value to a higher state in a progressively increasing manner, and exposure terminating means responsive to the quantum and actinic frequency of light transmitted by the record to terminate energization of said light generating means when a sufficient quantum and actinic value of light has been transmitted through said record to expose a photosensitive surface to a preselected degree.

3. In apparatus for the automatic control of exposure intervals of photographic records of varying densities, a source of illumination for generating light of variable wave lengths bearing an inverse proportional relationship to the intensity of excitation of said source, exposure initiating means providing a variable source of excitation energy for said source of illumination, means varying said source of excitation energy to vary energization of said source of illumination from a low initial state of excitation producing low actinic light to a higher state of excitation in a progressively increasing manner, and exposure terminating means responsive to the quantum and actinic value of light transmitted by the record to terminate energization of said source of illumination when a sufficient quantum of light has been transmitted through said record to expose a photosensitive surface to a preselected degree.

4. In apparatus for the automatic control of exposure intervals of photographic records of varying densities, a source of illumination for emitting light of varying wave lengths having different actinic characteristics proportional to the intensity of excitation of said source, exposure initiating means controlling energization of said source for varying the excitation of said source to emit light of progressively increasing actinic value from an initially low actinic value, and exposure terminating means responsive to the quantum and actinic value of light transmitted by the record to interrupt transmission of light through said record when a sufficient quantum and actinic value of light has been transmitted therethrough to expose a photosensitive surface to a preselected degree.

5. In apparatus for the automatic control of exposure intervals of photographic records of varying densities, a light source for emitting light at varying wave lengths having different actinic characteristics directly proportional to the intensity of excitation of said source, exposure initiating means providing a variable source of excitation energy for said light source for varying the state of excitation of said light source to produce light varying through a preselected spectral range of radiation frequencies, said means varying the light produced by said light source in accordance with the spectral sensitivity characteristics of photosensitive surfaces from an initial low photosensitive spectral distribution to a higher photosensitive spectral distribution, and exposure terminating means responsive to the quantum and spectral characteristics of the light transmitted through the record to terminate energization of said light source when a sufficient quantum of light has been transmitted through said record to expose a photosensitive surface to a preselected degree.

6. In apparatus for the automatic control of exposure intervals for copying photographic records of varying densities, incandescent lamp means for emitting light of varying wave lengths whose actinic values are directly proportional to the intensity of excitation of said lamp means, exposure initiating means including a source of excitation energy for said lamp means, means for progressively increasing the excitation current supplied from said source to vary the activation of said lamp means from an initially low state of excitation producing low actinic exposing light to a state producing high actinic exposing light, and exposure terminating means responsive to the quantum and actinic value of light transmitted by the record to terminate energization of said lamp means when a sufficient quantum and actinic value of light has been transmitted through said record to expose a photosensitive surface to a preselected degree.

7. Apparatus for automatically controlling exposure intervals during copying of photographic records comprising, incandescent lamp means bearing an inverse proportional relationship to the intensity of excitation of said lamp means, inductive means supplying excitation energy to said lamp means, control means intercoupled with said inductive means for varying the state of saturation of said inductive means to progressively increase the excitation current supplied by said inductive means to said lamp means from an initial low state of excitation of said lamp means producing low actinic light to a high actinic light producing state, light sensitive means responsive to the quantum and actinic value of the light generated by said lamp means and transmitted by the record disposed to receive light transmitted through said record, and exposure terminating means intercoupled between said light sensitive means and said means supplying excitation current to said lamp means to terminate supply of current to said lamp means when a sufficient quantum and actinic value of light has been transmitted through said record to expose a photosensitive surface to a preselected degree.

8. Apparatus for automatically controlling exposure intervals during copying of photographic records of varying densities comprising, incandescent lamp means for generating light of varying wave lengths proportioned to the intensity of excitation of said lamp means, means supplying excitation current to said lamp means to initiate an exposure, and having variable saturable inductor means intercoupled therewith controlling said excitation current, sweep voltage generating means intercoupled with said inductor means for controlling the saturation condition of the latter to progressively increase the current therethrough and vary the excitation of said lamp means from a low initial state of excitation producing low actinic light to a high state of excitation, a light sensitive cell responsive to the quantum and actinic value of light transmitted through the record disposed to receive a portion of such transmitted light, said cell being intercoupled with a condenser having a preselected initial charge for governing discharge of the condenser in accordance with the quantum and actinic value of light transmitted by the record, and means for interrupting the supply of current to said lamp means when said condenser has been discharged to a predetermined value.

JACOB RABINOWITZ.

REFERENCES CITED

The following references are of record in the file of this patent:

UNITED STATES PATENTS

| Number | Name | Date |
|---|---|---|
| 1,933,831 | Tuttle | Nov. 7, 1933 |
| 1,954,338 | Tuttle | Apr. 10, 1934 |
| 1,973,469 | Denis | Sept. 11, 1934 |
| 2,090,825 | Anthony | Aug. 24, 1937 |
| 2,500,049 | Williams | Mar. 7, 1950 |